(12) United States Patent
Lundbring

(10) Patent No.: US 10,096,957 B2
(45) Date of Patent: *Oct. 9, 2018

(54) CABLE CONNECTOR

(71) Applicant: Anders Lundbring, Skärholmen (SE)

(72) Inventor: Anders Lundbring, Skärholmen (SE)

( * ) Notice: Subject to any disclaimer, the term of this patent is extended or adjusted under 35 U.S.C. 154(b) by 0 days.

This patent is subject to a terminal disclaimer.

(21) Appl. No.: 15/712,964

(22) Filed: Sep. 22, 2017

(65) Prior Publication Data

US 2018/0013248 A1   Jan. 11, 2018

Related U.S. Application Data

(63) Continuation of application No. 15/130,021, filed on Apr. 15, 2016, now Pat. No. 9,800,000.

(30) Foreign Application Priority Data

Jun. 9, 2015   (SE) ...................... 1550769

(51) Int. Cl.
| | | |
|---|---|---|
| *G02B 6/38* | (2006.01) | |
| *H01R 24/64* | (2011.01) | |
| *H01R 11/12* | (2006.01) | |
| *H01R 24/58* | (2011.01) | |
| *H02G 1/08* | (2006.01) | |
| *G02B 6/44* | (2006.01) | |

(Continued)

(52) U.S. Cl.
CPC ........... *H01R 24/64* (2013.01); *G02B 6/3825* (2013.01); *G02B 6/4465* (2013.01); *H01R 11/12* (2013.01); *H01R 24/20* (2013.01); *H01R 24/58* (2013.01); *H02G 1/081* (2013.01); *H01R 43/28* (2013.01)

(58) Field of Classification Search
None
See application file for complete search history.

(56) References Cited

U.S. PATENT DOCUMENTS

| | | |
|---|---|---|
| 4,337,923 A | 7/1982 | Smith |
| 6,062,910 A | 5/2000 | Braquet |
| 9,285,559 B1 | 3/2016 | Stockton |

(Continued)

FOREIGN PATENT DOCUMENTS

| | | | |
|---|---|---|---|
| DE | 202006004223 U1 | 5/2006 | |
| GB | 2470584 A | 12/2010 | |

*Primary Examiner* — Sung H Pak
(74) *Attorney, Agent, or Firm* — Tucker Ellis LLP

(57) ABSTRACT

There is provided a male cable connector (1) for reversibly connecting a computer network cable (7) to form at least one electrical connection or one optical connection to a second component, said male cable connector (1) comprising a male member (3) enclosing at least one electrical lead (14) electrically connected to one electric contact surface (13) and the network cable (7) or said male member (3) enclosing at least one optical fiber (17) connected to an optical connection surface (22) and the network cable (7), said male member (3) being associated with a front direction which is parallel to the longitudinal axis of the male member (3) and directed from the cable (7) towards a forward end (11) of the male member (3) characterized in that said at least one electrical contact surface (13) or at least one optical connection surface (22) is arranged on the surface of the male member (3) and the male member (3) has a bore (4) for connecting a pull-cord. There is also provided a female connector, adaptors, cables and kits.

14 Claims, 12 Drawing Sheets

(51) Int. Cl.
*H01R 24/20* (2011.01)
*H01R 43/28* (2006.01)

(56) References Cited

U.S. PATENT DOCUMENTS

| | | |
|---|---|---|
| 9,800,000 B2 * | 10/2017 | Lundbring ............. H01R 11/12 |
| 2004/0013369 A1 | 1/2004 | Coffey |
| 2007/0160327 A1 | 7/2007 | Lewallen |
| 2008/0317415 A1 | 12/2008 | Hendrickson |
| 2010/0003858 A1 | 1/2010 | Myers |
| 2011/0043371 A1 | 2/2011 | German |
| 2011/0101290 A1 | 5/2011 | Carlson |
| 2011/0243505 A1 | 10/2011 | Su |
| 2012/0090145 A1 | 4/2012 | Montena |
| 2013/0028569 A1 | 1/2013 | Kempeneers |
| 2013/0058615 A1 | 3/2013 | Mathew |
| 2013/0209037 A1 | 8/2013 | Cooke |
| 2014/0086534 A1 | 3/2014 | Lu |
| 2016/0085045 A1 | 3/2016 | Hill |
| 2016/0349474 A1 | 12/2016 | Kowalczyk |

* cited by examiner

CABLE CONNECTOR

RELATED APPLICATION DATA

This application claims the benefit of U.S. patent application Ser. No. 15/130,021 filed Apr. 15, 2016, which claims the benefit of Swedish Application No. 1550769-2, filed Jun. 9, 2015, the disclosures of which are incorporated herein by reference in their entireties.

FIELD ON THE INVENTION

This invention relates to a cable connector for use with computer network cables, or other types of cables, and which facilitates installation of such cables. The connector has a bore for connecting a pull cord.

BACKGROUND

Computer network cables, for example Ethernet network cables, are the standard for providing local cable-bound computer network services. When installing network cables the installer often encounters the problem of pulling the cable through holes or pipes, for example a hole in a wall. This can be done by pulling the cable using a pull cord attached to the cable. The network cable often has modular type electrical connectors at the ends, and the pull cord is sometimes tied to the cable using the modular connector as a stopper.

A type of modular connector that is often used is often referred to as a RJ45 connector, but a more correct term is an 8P8C connector. The 8P8C connector is bulky and square and tends to snag and get stuck, for example at corners, when pulled as described above. Therefore it is difficult to pull it through holes and pipes.

GB2470584 provides a device for pulling optical cables comprising a covering end unit with a bore for attaching a pull string. A disadvantage with the covering end unit is that it must be screwed in place before use, and then removed, which is cumbersome (page 4, lines 16-19 of GB2470584).

DE202006004223 also provides an end piece with a bore for attaching a pull string. The end piece is screwed in place and covers a female connector of a cable.

Disadvantages with these solutions include that they comprise parts that are attached and detached during installation, which takes time. A second disadvantage is that they are screwed into place, which is time-consuming.

Alternatively cables without connectors are installed in a building, and connectors are attached after installation. A pull string may then be attached to the cable in various manners for example by tying a pull cord to the cable. It can however be difficult to obtain a reliable attachment of a pull cord to a cable. Sometimes adhesive tape is used to improve the attachment. However, this procedure is time-consuming and the attachment is not reliable. Fitting connectors on-site also has the disadvantage that the risk of connecting leads to wrong sockets increases.

SUMMARY OF INVENTION

It is an object of the invention to address at least some of the problems discussed above.

It is provided in a first aspect of the invention, a male cable connector for reversibly connecting a computer network cable to form at least one electrical connection or one optical connection to a second component, said male cable connector comprising a male member enclosing at least one electrical lead electrically connected to one electric contact surface and the network cable or said male member enclosing at least one optical fiber connected to an optical connection surface and the network cable, said male member being associated with a front direction which is parallel to the longitudinal axis of the male member and directed from the network cable towards a forward end of the male member characterized in that said at least one electrical contact surface or at least one optical connection surface is arranged on the surface of the male member and the male member has a bore for connecting a pull-cord.

An advantage with the connector is that the bore is integrated in the connector. Therefore there is no extra part that has to be attached to the connector to obtain a bore for attaching a pull string. There are also no moving parts, which is an advantage.

An additional advantage is that a cable that is easy to install and to pull through holes can be provided with pre-fitted connectors, which saves time during installation. It also reduces the risk of making errors during fitting of the connectors.

The male connector does not snag and is easy to pull through holes or pipes.

In an alternative embodiment the male member encloses both at least one electrical lead electrically connected to one electric contact surface and at least one optical fiber connected to an optical connection surface. A connector with such a male member is capable of forming both an electrical connection and an optical connection.

The male member may have at least one waist. The waist can be used for reversibly attaching the male member to a female member.

At least one electrical contact surface or at least one optical connection surface can be located in front of the waist so that an electrical lead or an optical fiber passes the waist. This has the advantage that the lead or the fiber reinforces the waist, which may otherwise be a weak point of the male member.

In one embodiment the male cable connector is for forming an optical connection. The cable connector then comprises at least one optical fiber.

In one embodiment the male cable connector is for forming an electrical connection. The cable connector then comprises at least one electrical lead. In a preferred embodiment there is a plurality of contact surfaces, each connected to one electrical lead. The number of contact surfaces and leads are preferably at least two, more preferably at least four and most preferably at least eight. Most electrical computer network cables have eight leads.

When the cable connector is for an electrical connection and the cable connector has a plurality of contact surfaces, a contact surface may be arranged in the waist or in the bore. This has the advantage that, when there are several electrical contact surfaces, the male member can be made smaller. When there is a plurality of contact surfaces, they may be distributed along the longitudinal axis of the male member. The male member may have a circular profile and the contact surfaces may have the shape of rings around the male member.

In one embodiment the male cable connector has both an electrical and an optical connection. Thus it is provided a male cable connector comprising a male member enclosing at least one electrical lead electrically connected to one electric contact surface and the network cable said male member also enclosing at least one optical fiber connected to an optical connection surface and the network cable, were said electrical contact surface and at said optical connection surface are arranged on the surface of the male member.

In a second aspect of the invention there is provided a female connector for reversibly connecting a male cable connector according to the invention to form an electrical or optical connection, said female connector comprising a housing and receptacle for receiving the male member of the male cable connector. There is also provided a device comprising a female connector according to the invention, in particular a computer network connection. The device may be a computing or network device such as a server, a router or a PC.

The female connector may have a bore for a locking pin that also is inserted into the bore of the male member. Such a locking pin is able to lock the male connector in the female connector.

In a third aspect of the invention there is provided an adaptor comprising a female connector according to the invention where the connection is an electrical connection and where said adaptor comprises a male modular connector, such that an electrical connection is formed between the male cable connector and the male modular connector when the male cable connector is connected to the female connector. The modular connector may be an 8p8C connector. This adaptor can be used for connecting a network cable with a male connector according to the invention to a device with a female modular connector, for example a computer.

In a fourth aspect of the invention there is provided an adaptor comprising a female connector according to the invention, where the connection is an electrical connection and where said adaptor comprises a female modular connector, such that an electrical connection is formed between the male cable connector and the female modular connector when the male cable connector is connected to the female connector. The modular connector may be an 8p8C connector. This adaptor can be used for connecting a network cable with a male connector according to the invention, with a regular network cable.

In a fifth aspect of the invention there is provided an adaptor comprising two electrically connected female connectors according to the invention, where the male electrical connector can form a connection with either of the female cable connectors. This adaptor can be used for connecting two cables with male connectors according to the invention.

In a sixth aspect of the invention there is provided an optical or electrical computer network cable with a male cable connector according to the invention in each end. Such a cable is useful for installing in buildings. The network cable, when it is an electrical cable, can have a length of from 20 cm to 100 m, more preferably from 20 cm to 100 cm. The network cable, when it is an optical cable, can be from 20 cm to 1000 m.

In a seventh aspect of the invention there is provided a kit comprising an optical or electrical computer network cable according to the invention and either two adapters with male modular connectors or two adapters with female modular connectors, as described above.

DETAILED DESCRIPTION

Figure 1:
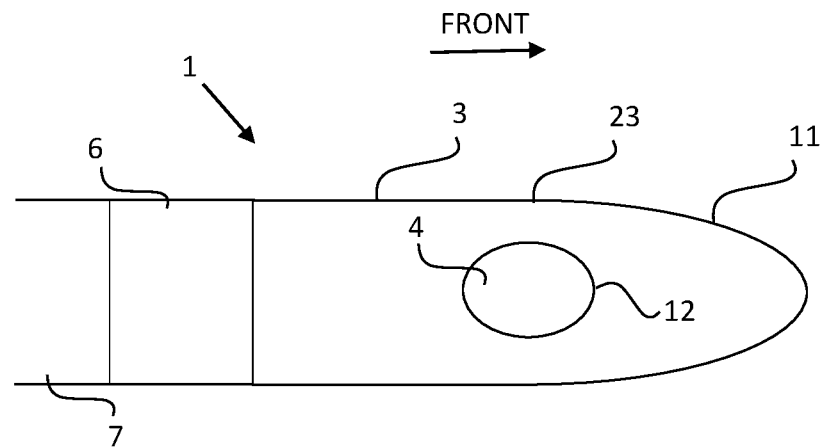
FIG. 1 schematically shows a male connector.
Figure 2:
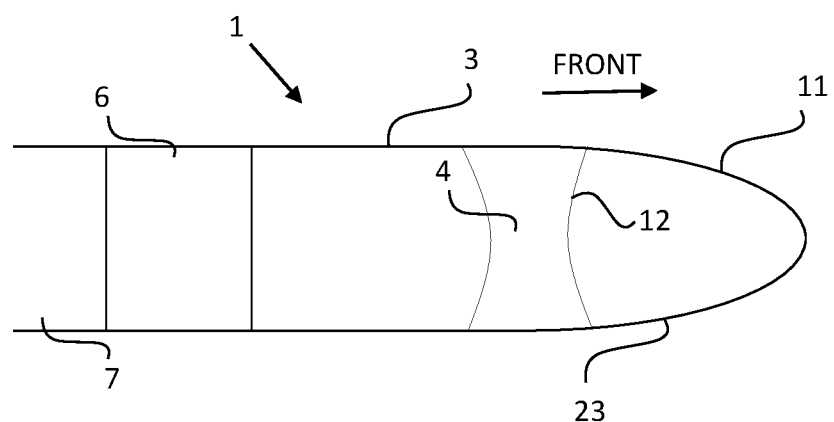
FIG. 2 is a schematic cross section of the male connector of FIG. 1 turned 90° along the longitudinal axis compared to FIG. 1.
Figure 3:
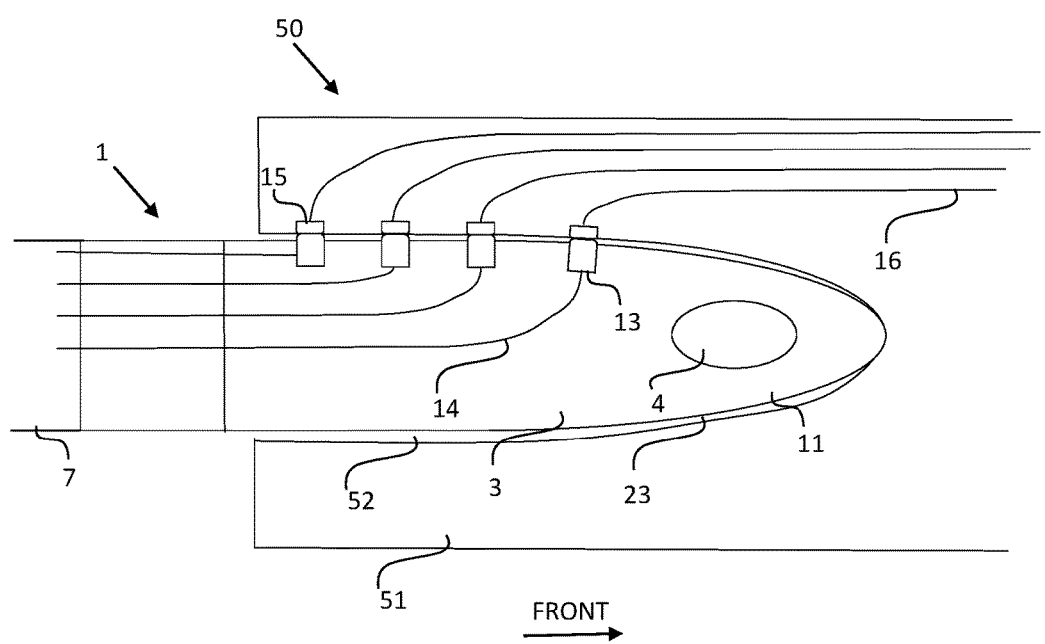
FIG. 3 schematically shows a cross section of an electrical connection formed by a male connector and a female connector.

With reference to FIGS. 1, 2 and 3 the male cable connector 1 has a male member 3 with a bore 4 for connecting a pull cord 5 and is configured to couple with a female cable connector 50 to form an electrical or an optical connection. The male member 3 is configured to fit in a receptacle 52 of the female cable connector 50.

An optical connection is a connection between fibers used in fiber optic cables, preferably for transmitting digital light signals.

Figures 17A, 17B, 17C:
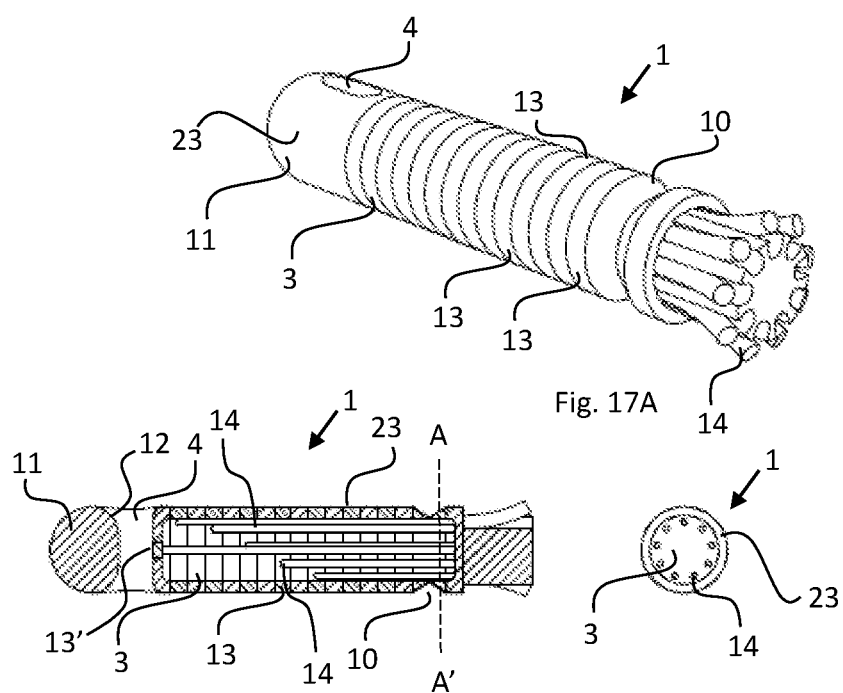
FIGS. 17A-17C show a male electrical cable connector

The connector 1, 50 has a longitudinal axis which is the axis parallel to the male member 3. The forward (or front) direction of the male connector 1 is a direction parallel to the longitudinal axis and directed from the cable 7 towards the forward end 11 of the male member 3. The front direction is indicated with an arrow in FIGS. 1-3. The male member 3 has a profile which is the shape of the cross section of the male member 3 when the male member is seen with the longitudinal axis perpendicular to the plane of the paper. By way of example, FIG. 17C shows an example of a profile, and the cross section is along line A-A' in FIG. 17B.

A cable attachment means 6 may be used for permanently connecting the cable connector 1, 50 to cable 7. The cable 7 and the cable attachment means 6 does not form a part of this invention.

Figure 9:
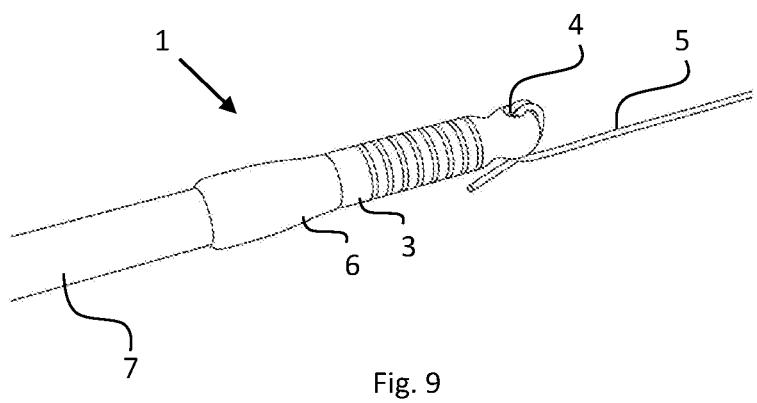
FIG. 9 shows a male connector.

The bore 4 is adapted for receiving a pull cord 5 which can be for example a metal wire. The bore 4 may be at least 2 mm wide, more preferably at least 3 mm wide. The pull cord 5 can be fastened by tying a noose, or lashing. FIG. 9 shows a male cable connector 1 with pull cord 5 attached.

The pull cord 5 is used for pulling the cable 7 through a hole or a pipe, for example a hole in a wall in a building where the cable 7 is to be installed.

The front side 12 of the wall of the bore 4 can preferably have a rounded shape to receive a pull cord 5 as seen in FIGS. 2 and 17B.

The bore 4 may have an oblong or elliptical shape as can be seen in FIG. 1, in order to receive a flattened pull cord. Often a metal wire is used as a pull cord 5. When a metal wire is cut, it may become slightly flattened. The oblong or elliptical shape of the bore 4 makes it suitable to receive such an end of a metal wire.

Optionally the bore 4 can be used for locking the male member 3 in the receptacle 52. This is particularly advantageous when the connection is an optical connection. Then it is of particular importance that the male member 3 is correctly positioned in the receptacle 52 of the female connector 50.

The profile of the male cable connector 1 is preferably no larger than the profile of the cable 7, such that the profile of the male connector 1 can fit within the profile of the cable 7, i.e. the diameter of the cable 7. The small profile makes it easier to pull the male cable connector 1 through holes and makes it possible to install cables behind doorframes and such spaces. When the profile of the male connector 1 is circular and the male connector 1 is intended for use with a computer network cable the diameter of the male connector is preferably less than 8 mm, more preferably less than 7 mm and more preferably less than 6.5 mm, and most preferably less than 6 mm. This also has the advantage that it is easy to pull the cable 7 backwards if necessary.

The length of the male member 3 of cable connector 1 is preferably shorter than 25 mm, even more preferably shorter than 20 mm. This makes it easier to pull the male cable connector 1 through curved holes and pipes.

The forward end 11 of the male member 4 may be bullet shaped. This has the advantage of minimizing snag when pulling the male connector 1 through holes and pipes.

Figure 14:
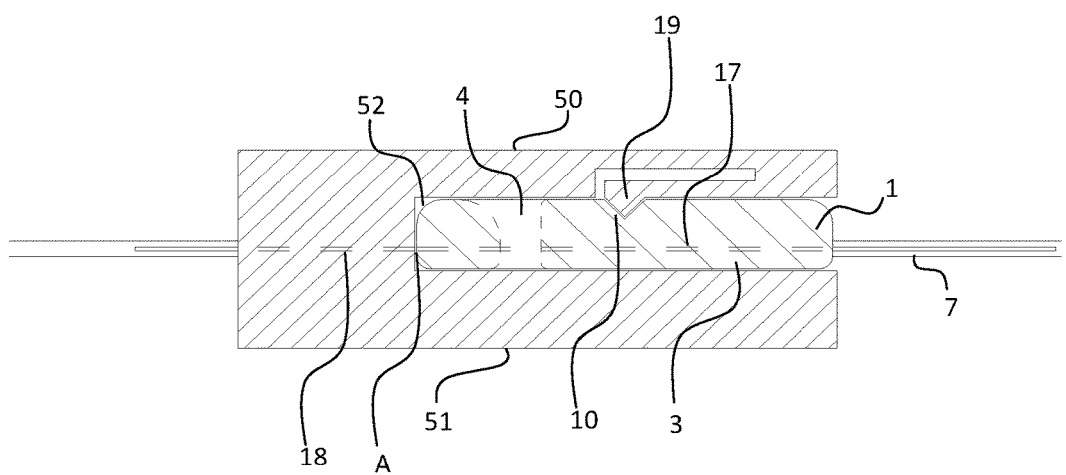
FIG. 14 schematically shows a cross section of male and a female connectors forming an optical connection.

The male member 3 may be reversibly attached to the receptacle 52 of the female connector 50 by different means, for example a press fit between male member 3 and receptacle 52. The male member 3 may have a waist 10 (FIG. 4) for attaching the male member 3 in the receptacle 52. The receptacle 52 then preferably has a spring loaded member 19 that fits into the waist 10. An example is shown in FIG. 14.

In a preferred embodiment the cable 7 is a computer network cable such as an electrical or optical network cable 7, preferably an electrical network cable. The network cable 7 may be an electrical Ethernet network cable. Computer network cables are today often used for digital video cameras.

Preferably the male connector 1 and in particular the male member 3 has a cylindrical profile as shown in FIG. 4 and FIGS. 17A-17C, in particular 17C. This has the advantage of minimizing snag and that the male member 3 can be inserted into the receptacle 52 of the female cable connector 50 from any angle and without turning the male member 3.

FIG. 3 schematically shows a male connector 1 which is an electrical connector. The electrical connector 1 in FIG. 3 has four electrical contact surfaces 13. Inside the connector 1 are electrical leads 14 from the leads of the cable 7 to each of the electrical contact surfaces 13. Female connector 50 has electrical contact surfaces 15 for contacting contact surfaces 13 of male member 3 and leads 16 for connecting downstream, for example to a device or to another cable. Connector 1 has at least one lead 14 and the corresponding number of contact surfaces 13, and female connector 50 preferably has the corresponding number of leads 16 and contact surfaces 15. Most computer network cables has at least four leads and the standard is today eight leads. Therefore preferably the male member 3 has at least four leads 14 more preferably at least six leads 14 and most preferably at least eight leads 14, and the corresponding number of contact surfaces 13. The female connector 50 preferably has the corresponding number of leads 16 and contact surfaces 15.

Each electrical contact surface 13 is connected to one electrical lead 14 inside the male cable connector 1. Each lead 14 is intended to be connected to a lead in the cable 7. Each lead in the cable 7 is intended to be connected to a lead 14 in the male cable connector 1.

The electrical leads 14 in the male connector may serve as reinforcement of male connector 1, in particular when the male connector 1 is made of a polymer material, to protect the male connector 1 from bending damages. It is advantageous that the waist 10 is located where there are leads 14, since the waist 10 may be a weak point of the male member 3. This reinforcement effect is best when there are at least four leads 14, preferably at least six leads 14, and most preferably at least eight leads 14.

The electrical leads 14 in the male connector 1 are connected to the leads in the cable 7 by methods known in the art, for example by crimping.

The contact surfaces 13 and 15 may have any suitable form, and may be arranged in any suitable geometry. When there is a plurality of contact surfaces 13 they are arranged so that they are electrically isolated from each other. There is preferably a non-conductive material between them. The same applies to the contact surfaces 15 in female connector 50.

Figure 4:
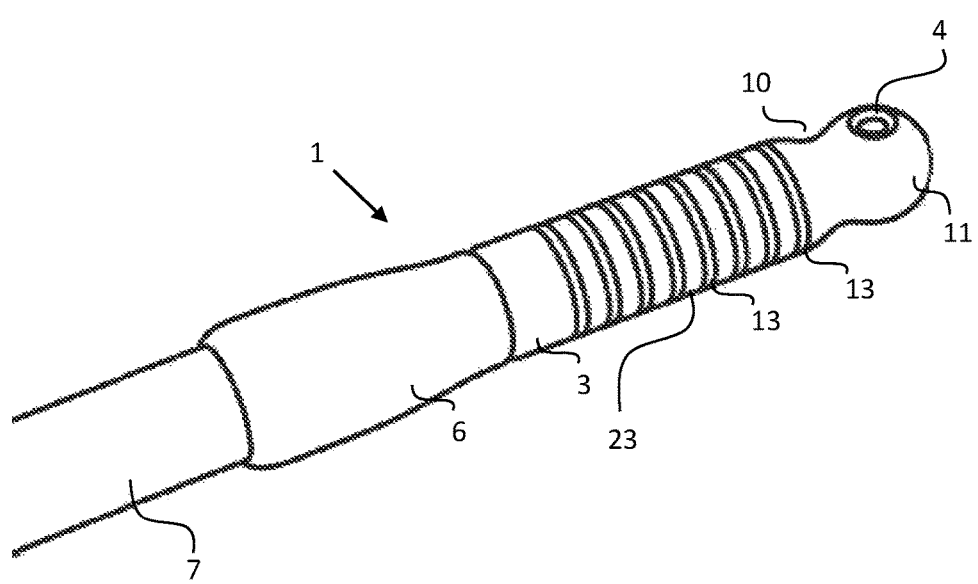
FIG. 4 shows a male electrical connector.

FIG. 4 shows a male connector 1 for an electric computer network cable 7. The profile of the male connector 1 is circular, and the profile of the male member 3 is circular. The contact surfaces 13 are in the shape of rings around the male member 3, said rings being distributed along the longitudinal axis of the male member 3. Between the contact surfaces 13 are ring-formed sections of the male member made of a non-conductive material. The receptacle 52 of a female member 50 which is adapted to receive this type of male connector 1 has contact surfaces 15 that are arranged along the longitudinal axis of the receptacle 52 as shown in FIG. 3. The number of contact surfaces 13 in FIG. 4 are eight but there may be any suitable number of contact surfaces 13, depending on type of cable 7.

The male member 3 may taper off towards the forward end 11. When the male connector 1 is an electrical connector with contact surfaces 13 in the shape of annular rings, the rings may thus have smaller diameter towards the forward end 11. This has the advantage that the risk of erroneous connection is minimized. This may be particularly important if some leads in the cable 7 are used for powering a device. This shape may also minimize snag when pulling connector 1.

Figure 18:
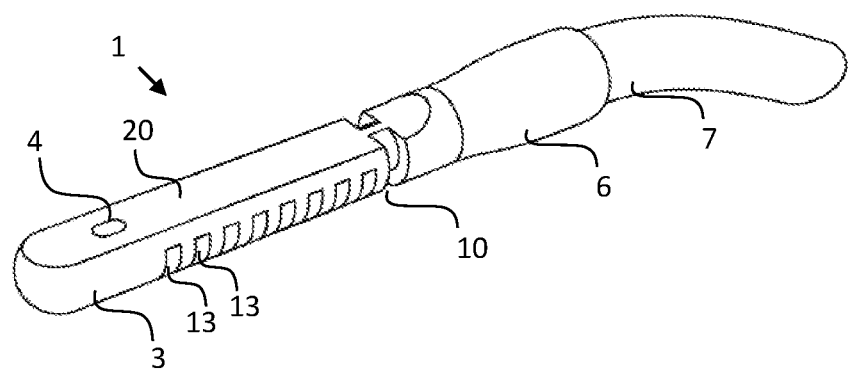
FIG. 18 shows a male electrical cable connector.

The male member 3 for an electrical connection may also have the D-shaped profile shown in FIGS. 15 and 16, which are discussed below. The contact surfaces 13 may then have the shape of circular segments that are distributed along the longitudinal axis of the male member 3. An example of this electrical male cable connector is shown in FIG. 18.

As mentioned above, the leads 14 and the waist 10 are preferably arranged so that leads 14 reinforce the male member 3 at the waist 10 which is the weakest point of male member 3. Contact surfaces 13 are therefore preferably arranged in front (i.e. towards forward end 11) of waist 10 so that as many leads 14 as possible must pass waist 10. The number of leads 14 that pass the waist 10 is preferably at least one, more preferably at least two, more preferably at least three, more preferably at least four, more preferably at least five, more preferably at least six, more preferably at least seven and most preferably at least eight. The corresponding number of contact surfaces 13 are placed in front of waist 10, thus between waist 10 and forward end 11. Preferably the leads 14 are evenly spaced at waist 10 as shown in FIG. 17C.

A contact surface 13 may also be positioned at a waist 10. A contact surface may also be placed in the bore 4 when there is a plurality of contact surfaces 13. This has the advantage that the male member 3 can be made shorter. The female connector 50 then preferably has spring loaded contact surface 15 for interacting with the waist 10 or bore 4. This contact surface 15 can for example be arranged like member 19 in FIG. 14.

FIGS. 17A-17C shows an embodiment of connector 1 with contact surfaces 13 in the shape of annular rings around the male member 3 where said rings are distributed along the longitudinal axis of male member 3. Between the contact surfaces 13 are ring-formed sections of the male member made of a non-conductive material. All but one contact surface 13 are arranged in front of waist 10 so that most leads 14 must pass waist 10. One annular contact surface 13 may be located at waist 10 and then the lead 14 for that particular contact does not necessarily pass waist 10. Leads 14 may be arranged in a circular pattern in male member 3 as shown in FIG. 17C which is a cross section at A-A' in FIG. 17B, thus 17C shows the profile of the male member 3. The leads 14 are preferably evenly spaced along the circumference of male member as shown in FIG. 17C. One contact surface 13' is arranged in bore 4 in FIG. 17B, however this is not necessary.

Figure 5:
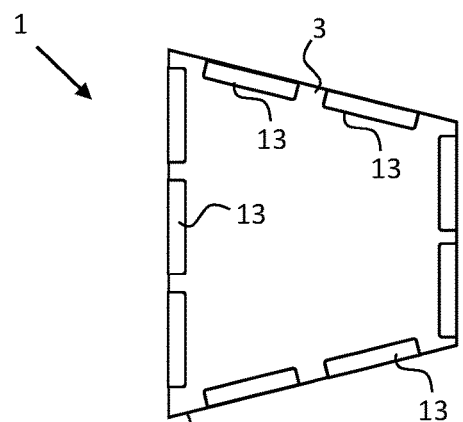
FIG. 5 is a schematic cross section showing the profile of an example of male member.
Figure 6:
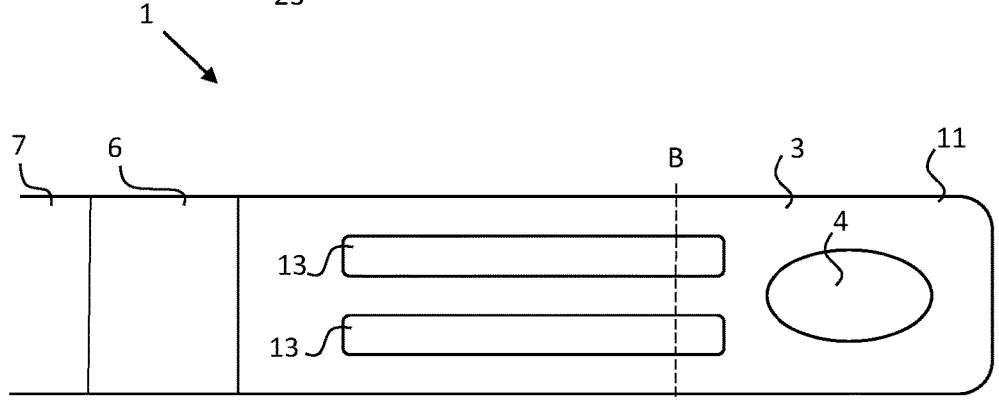
FIG. 6 schematically shows a male electric connector.
Figure 7:
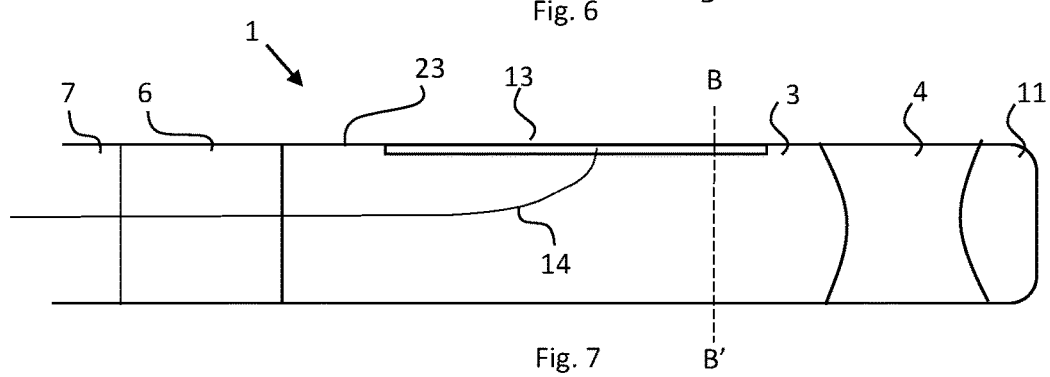
FIG. 7 is a schematic cross section of the male connector of FIG. 6, turned 90° along the longitudinal axis in relation to FIG. 6.

The male member 3 of FIGS. 5-7 has a trapezoid profile and nine contact surfaces 13. FIG. 5 schematically shows the cross section (profile) of the male member 3 and the positions of contact surfaces 13 along line B-B' in FIGS. 6-7. The contact surfaces 13 are spaced along the circumference of the male member 3 instead of along the longitudinal axis as in FIG. 4. The arrangement of contact surfaces 15 in a receptacle 52 for the connector of FIGS. 5-7 is adapted to this. FIG. 6 schematically shows the exterior of one side of the trapezoid of the connector 1. FIG. 7 schematically shows the interior of the connector 1. One lead 14 is indicated in FIG. 7, but there is of course one lead 14 for each of the nine contact surfaces 13. The trapezoid shape has the advantage of allowing the male connector 1 to be inserted into the female connector 50 in one orientation only, which ensures that the correct contact surface 13 of the male connector 1 is connected to the corresponding contact surface 15 of the female connector 50.

Figure 8:
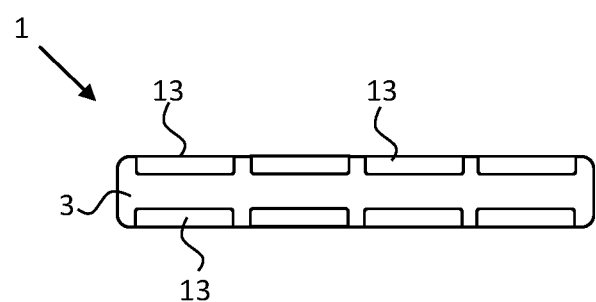
FIG. 8 is a schematic cross section of the profile of an example of male member.

FIG. 8 schematically shows an embodiment of a profile of the male member 3. Here the male member 3 has a rectangular profile. The contact surfaces 13 are spaced along the circumference of the male member 3, much in the same way as in FIG. 5.

The female connector 50 is adapted to reversibly attach to the male connector 1. The female connector 50 has a housing 51 comprising a receptacle 52 for receiving the male member 3 of the male cable connector 1.

FIG. 3 shows how a female connector 50 can be arranged to receive a male member 3 to form electrical connections. The contact surfaces 15 of the female connector 50 are arranged in the receptacle 52 so that contact surfaces 13 are brought in electrical contact with contact surfaces 15 when the male member 3 is inserted into the receptacle 52.

The female connector 50 may be adapted to change its conformation when the male member 3 is inserted. For example the receptacle 52 may clasp the male member 3 when the male member 3 is inserted into receptacle 52. The male member 3 may have an interaction surface for inducing this conformation change in female connector 50.

The female connector 50 may have a locking member that is inserted into the bore 4 of the male member 3 when the male member 3 is inserted into the receptacle 52. A contact surface 15 may be arranged on the locking member for forming an electrical contact with a contact surface 13' in the bore 4.

The female connector 50 may have a bore 301a, 301b for guiding a locking pin into the bore 4 of the male member 3. The bore 301a, 301b may be aligned with the bore 4 of the male member 3 because of the keying of the male member 3. The locking pin can be manually inserted into the bore 301a, 301b of the female connector 50. The locking pin then locks the male member 3 in the female connector 50.

The female connector 50 may be integrated into a device where it is useful to connect a cable 7 with a male connector 1, for example a cable, a PC, a laptop, a network card or a server.

Figure 10A:
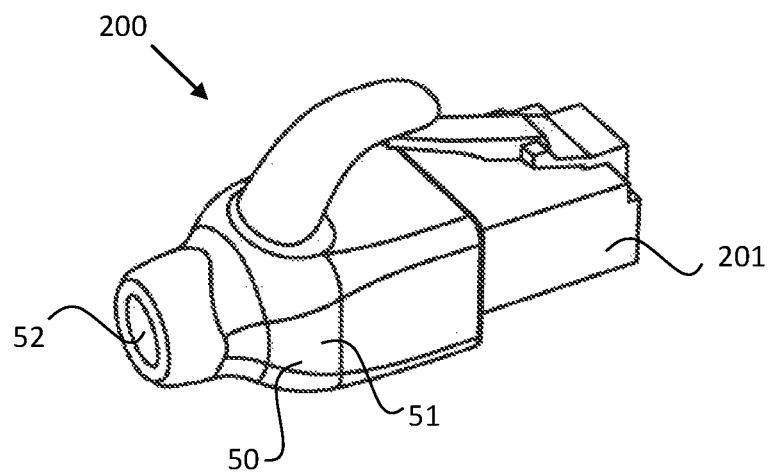
FIGS. 10A-13 are examples of adaptors.
Figure 10B:
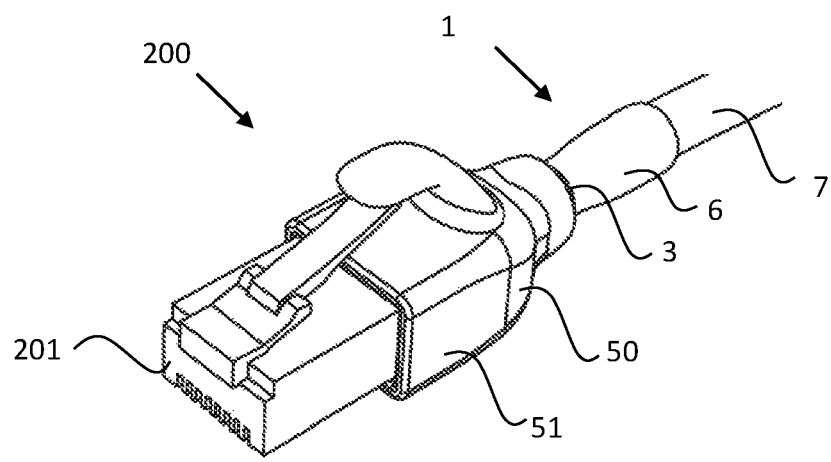

The female connector 50 may additionally be integrated in an adaptor. The adaptor may be for an electrical connection, an optical connection or a combined electrical and optical connection. FIGS. 10A-10B show an adaptor 200 for connecting a male connector 1, which is an electric connector, to a device with a female modular connector. The adaptor 200 comprises a female cable connector 50 and a male modular connector 201. The adaptor 200 allows connection of computer network cable 7 with a male connector 1 to a female modular connector, for example an 8P8C female connector. The male modular connector 201 may be a male 8P8C connector. The 8P8C male connector is frequently used for Ethernet network cables and the 8P8C female connector is frequently used in for example PCs, servers, and routers. Thus, such an adapter 200 can be used for connecting a computer network cable 7 with a male connector 1 to a standard 8P8C female connector. FIG. 10B shows how cable 7 with male connector 1 is connected to adaptor 200 with an integrated male modular connector 201, which may be a male 8P8C connector. The adaptor 200 comprises internal leads that ensure the correct pin-out.

Figure 11:
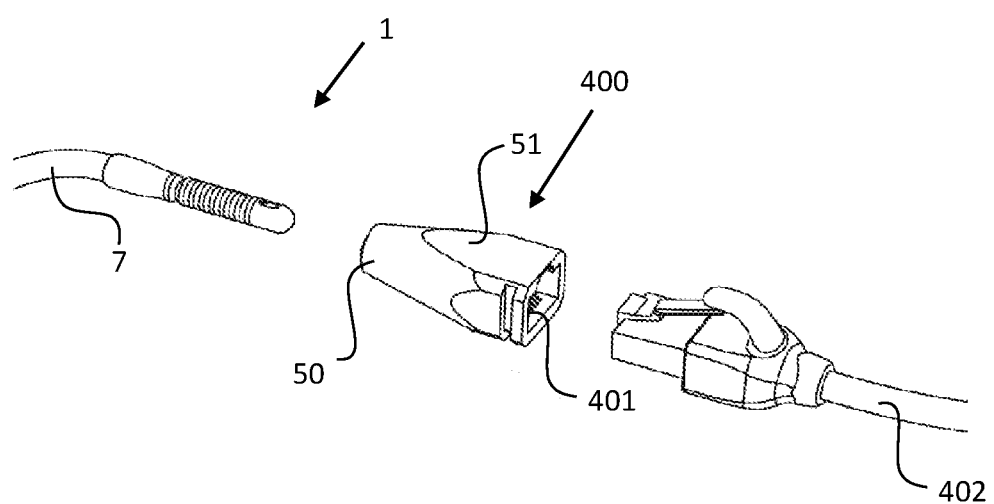

FIG. 11 shows an adaptor 400 for connecting a cable 7 with a male connector 1 which is an electric connector, to a device with a male modular connector, in this case a network cable 402. The adaptor 400 comprises female connector 50 and female modular connector 401. The female modular connector 401 may be a female 8P8C connector. The adaptor 400 allows connection of computer network cable 7 with a male connector 1 to a male modular connector, for example an 8P8C male connector. Adaptor 400 is convenient for attaching network cable 7 to a regular network cable 402. The adaptor 400 comprises internal leads that ensure the correct pin-out.

Figure 12:
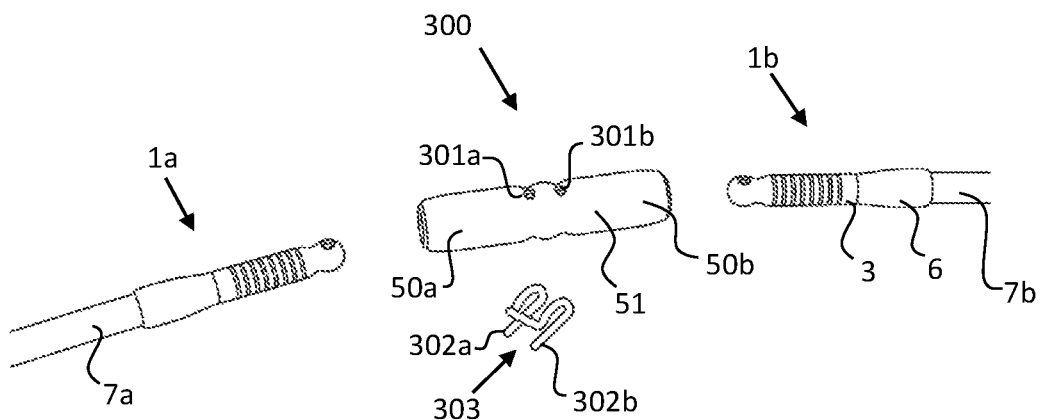
Figure 13:
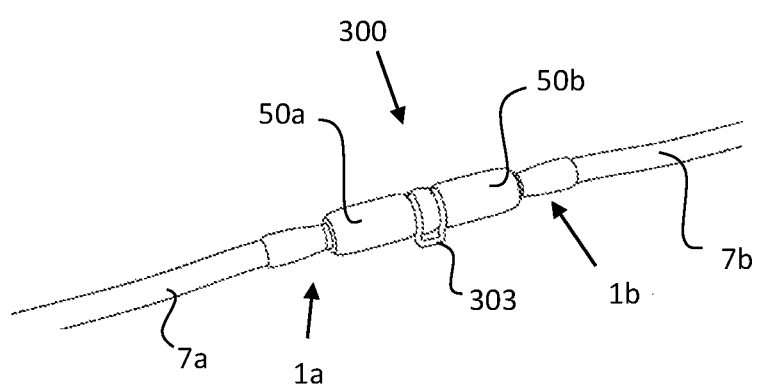

An alternative adaptor 300 is shown in FIGS. 12-13. The adaptor 300 can be used for connecting two cables 7a and 7b that each have male connectors 1 of the same kind in each end. The adaptor 300 comprises two female cable connectors 50a and 50b integrated into one housing 51. Both female connectors 50a and 50b are preferably adapted to receive male connectors 1 of the same design such that a certain male connector 1 can be inserted into either of 50a or 50b and thereby form a connection. The adaptor 300 comprises internal leads that ensure the correct pin-out.

The adaptor 300 may have at least one bore 301a, 301b for securing a male member 3 in a receptacle 52. A locking pin 302a, 302b can be manually inserted into the bore 301a, 301b for securing male member 3 in the female member 50. There may be two bores 301a and 301b, for securing a male member 3 in each of female connectors 50a and 50b. The two bores 301a and 301b may be arranged along a line that is parallel to the longitudinal direction of the adaptor 300. Two locking pins 302a and 302b may be arranged together to form a clamp 303 that can be attached to adaptor 300 as in FIGS. 12-13. By inserting the locking pins 302a and 302b in bores 301a and 301b the two cables 7a and 7b are securely but reversibly attached and electrically connected to each other.

The adapters shown in FIGS. 10A, 10B, 11, 12 and 13 can be also be arranged for an optical connection or a combined electrical and optical connection. The adaptors of FIGS. 10A, 10B and 11 would then not have a modular connector.

FIG. 14 shows how the male connector 1 and the female connector 50 may be arranged when the connection is an optical connection. In this case the male member 3 comprises at least one optical fiber 17 which is brought in optical contact with optical fiber 18 of female connector 50 along surface A when the male member 3 is brought into receptacle 52. Optical fibers 17 and 18 are shown with dashed lines. The number of optical fibers can be 1, 2, 3, 4, or more. When there are two optical fibers they may be arranged one on each side of bore 4. The profile of the male member 3 may have any suitable shape, for example those shapes as described above with reference to FIGS. 4-8. The female connector 50 may have a spring loaded member 19 for interacting with waist 10 of male connector 1. Waist 10 is located behind forward end 11 and optical connection such that optical fiber 17 reinforces waist 10 as described with reference to FIGS. 17A-17C. The inner surface of receptacle 52 may be provided with a soft and light-sealing layer that prevents leakage of light.

Figure 15:
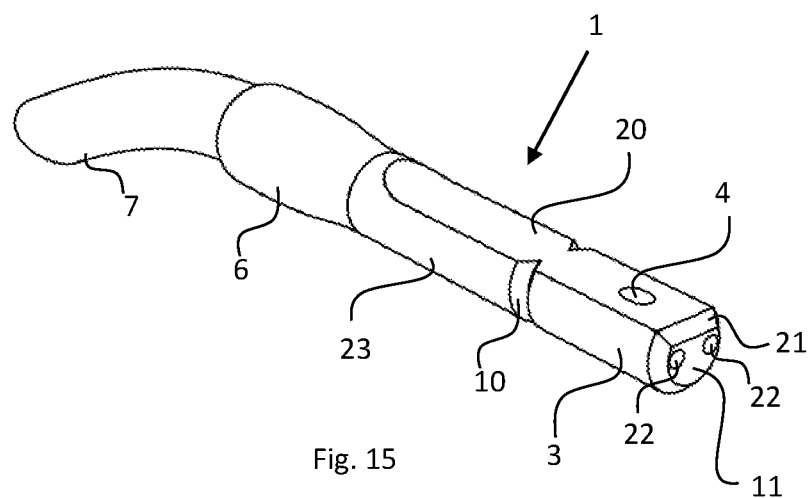
FIGS. 15-16 show an optical connector.
Figure 16:
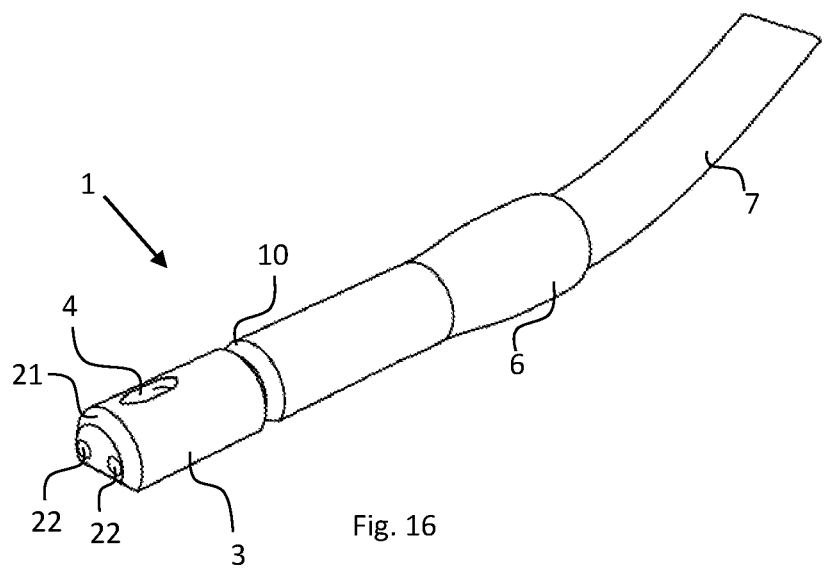

FIGS. 15 and 16 show different views of a male cable connector 1 with two optical fibers 17. The cross section of the optical fibers 17 that form optical connections at A in FIG. 14 are visible. The cross section of optical fiber 17 forms an optical connection surface 22 where optical fiber 17 reaches the surface of male member 3. The male member 3 in FIGS. 14, 15 and 16 have a forward end 11 that has a flat part, rather than being bullet shaped. This is because the optical connection at A needs a flat surface. The forward end 11 of the male member 3 is however tapered at surface 21 in order to prevent snagging when pulling. Flat surface 20 provides a key for correct connection when there is more than one optical fiber 17.

Figure 19:
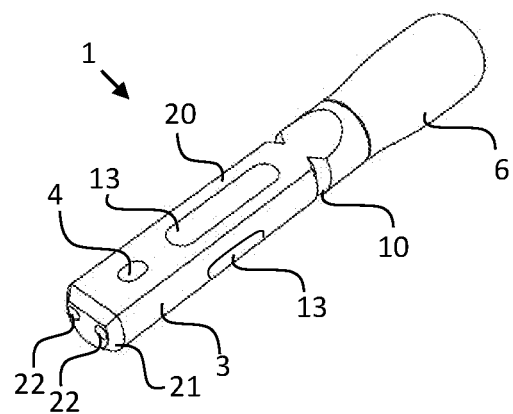
FIG. 19 shows a male combined electrical- and optical connector.

FIGS. 19 shows a connector 1 which is a combined electrical and optical connector. The male member 3 has two optical connection surfaces 22 in the front end 11 and one electrical contact surface 13 on the flat surface 20 and one electrical contact surface 13 on the opposite side of male member 3. Such a combined optical connector 1 has both electrical leads 14 and optical fiber 18. The electrical leads 14 and electrical contact surfaces 13 are preferably used for powering a device whereas the optical fiber 18 and optical connection surface 22 may be used for transferring a data signal. This type of connector can be used for example for digital surveillance cameras Leads 13 and optical fibers 17 are preferably arranged inside male member 3, however the optical connection surface 22 may form a part of optical fiber 17.

Preferably the male member 3 should not have any protruding parts. The electrical contact surfaces 13 or optical connection surfaces 22 are preferably arranged on the surface 23 of the male member 3. Note however that one or more contact surfaces may be arranged in bore 4. The outer surface of contact surfaces 13 are preferably level with surface 23 of male member 3. This has the advantage of minimizing snag and collection of contamination such as dust during use. If the male member 3 becomes dusty during use it is simple to wipe it off to remove the dust.

The male connector 1 may consist of only male member 3 and lead 13 or leads 13 or male member 3 and fiber 17 or fibers 17, Adaptors 200, 300 and 400 may be arranged for optical connections instead of electrical connections.

The invention may also be applied to other types of cables than network cables, for example power cables (such as 110 V or 230 V power cables) or alarm cables.

The male and the female connectors 1 and 50 and the adaptors 200 and 300 can be made in any suitable material. When the connection is an electrical connection the male cable connector 1 and housing 51 are preferably made of non-conductive material such as a non-conductive polymer material. However, the contact surfaces 13, 15 and leads 14, 16 are made in a conductive material, such as a conductive metal.

FIGS. 3 to 13 and 17 show electrical connectors and adaptors, and FIGS. 14 to 16 show optical connectors. It should be noted, however, that various features that are disclosed in the various embodiments can be combined when possible.

The male cable connector 1, when it is for an optical cable, can be sold without the fiber. It then has an empty space where the user may place an optical fiber.

While the invention has been described with reference to specific exemplary embodiments, the description is in general only intended to illustrate the inventive concept and should not be taken as limiting the scope of the invention. The invention is generally defined by the claims.

The invention claimed is:

1. A male cable connector, comprising:
   a male member that reversibly connects a cable with a mating female connector to form at least two electrical connections, the male member:
     having an electric contact surface corresponding to each electrical connection; and
     enclosing an electrical lead corresponding to each electrical connection, each electrical lead electrically connected to a corresponding one of the electric contact surfaces and the cable and
   wherein said male member being associated with a front direction which is parallel to the longitudinal axis of the male member and directed from the cable towards a forward end of the male member;
   wherein said electrical contact surfaces is arranged on the surface of the male member; and
   wherein the male member has a bore transverse the longitudinal axis, a pull-cord being connectable to the male member by passage through the bore.

2. The male cable connector according to claim 1 where the male member has at least one waist.

3. The male cable connector according to claim 2 where at least one electrical contact surface is located in front of the waist so that an electrical lead passes the waist.

4. The male cable connector according to claim 1 where the male member has at least one waist and where a contact surface is located on the at least one waist.

5. The male cable connector according to claim 1 where a contact surface is located in the bore.

6. The male cable connector according to claim 1 where there is a plurality of electrical contact surfaces that are distributed along the longitudinal axis of the male member.

7. The male cable connector according to claim 1 where the cable is a power cable.

8. The male cable connector according to claim 7 wherein the male member has a circular profile and where contact surfaces have the shape of rings around the male member.

9. The male cable connector according to claim 1 where the cable is an alarm cable.

10. The male cable connector according to claim 1 wherein the male member encloses both the electrical leads electrically connected to the electric contact surfaces and at least one optical fiber connected to optical connection surfaces, wherein the electrical contact surfaces and optical connection surface are arranged on an exterior surface of the male member.

11. The male cable connector according to claim 10 where the electrical leads and electrical contact surfaces are used for powering a device whereas the optical fiber and the optical connection surface is used for transferring a data signal.

12. The male cable connector according to claim 11 where the device is a digital surveillance camera.

13. An adaptor assembly comprising two opposed female receptacles that each respectively reversibly receive a male cable connector according to claim 1 to form at least one of the electrical connections between pairs of cables.

14. An electrical power cable or an alarm cable with a male cable connector according to claim 1 at each end.

* * * * *